US012342229B2

(12) United States Patent  
Polaganga et al.

(10) Patent No.: US 12,342,229 B2  
(45) Date of Patent: Jun. 24, 2025

(54) SYSTEM AND METHOD OF SECONDARY NODE ASSISTED DUAL CONNECTIVITY IN WIRELESS NETWORKS

(71) Applicant: T-MOBILE INNOVATIONS LLC, Overland Park, KS (US)

(72) Inventors: Roopesh Kumar Polaganga, Bothell, WA (US); Madhav Ram Nusetty, Snohomish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 383 days.

(21) Appl. No.: 18/076,588

(22) Filed: Dec. 7, 2022

(65) Prior Publication Data

US 2024/0196284 A1 Jun. 13, 2024

(51) Int. Cl.  
*H04W 36/00* (2009.01)

(52) U.S. Cl.  
CPC ........ *H04W 36/00835* (2018.08); *H04W 36/00837* (2018.08); *H04W 36/008375* (2023.05)

(58) Field of Classification Search  
CPC ..... H04W 36/00835; H04W 36/00837; H04W 36/008375  
See application file for complete search history.

(56) References Cited

U.S. PATENT DOCUMENTS

| 2006/0003775 A1* | 1/2006 | Bull .................. H04W 4/90 455/466 |
| 2009/0247150 A1* | 10/2009 | Fischer ............ H04W 36/0058 455/425 |
| 2010/0323723 A1* | 12/2010 | Gerstenberger ...... G01S 5/0226 455/456.5 |
| 2015/0045043 A1* | 2/2015 | Chou .................. G01S 5/12 455/446 |
| 2015/0195805 A1* | 7/2015 | Schmidt ............. H04W 4/02 455/456.1 |
| 2016/0044453 A1* | 2/2016 | Chou ............... H04L 12/6418 455/456.1 |
| 2016/0183152 A1* | 6/2016 | Yoshizawa ......... H04W 48/00 455/444 |
| 2017/0111764 A1* | 4/2017 | Chou ................ G01S 19/12 |

(Continued)

FOREIGN PATENT DOCUMENTS

WO WO-2013048331 A1 * 4/2013 ............ H04W 24/10

*Primary Examiner* — Kenny S Lin  
(74) *Attorney, Agent, or Firm* — Shook, Hardy & Bacon L.L.P.

(57) ABSTRACT

Systems and methods are provided for a secondary node that provides assistance to primary nodes in determining whether a user device should be switched to another primary node in order to improve the service experience. In aspects, when a user device is operating with dual connectivity, a secondary node can determine whether the service experience for the user device can be improved with a handover to another primary node based on the timing advance value and/or angle of approach value for the user device relative to an index that defines value(s) for matching a user device to available primary nodes. When the service experience can be improved, the secondary node sends an assist notification to the primary node that presently serves the user device, which triggers the primary node to hand over the user device to the other primary node identified for service improvement.

20 Claims, 7 Drawing Sheets

(56) References Cited

U.S. PATENT DOCUMENTS

| | | | |
|---|---|---|---|
| 2020/0213887 A1* | 7/2020 | Chen .................... | H04W 88/06 |
| 2023/0262633 A1* | 8/2023 | Xiong ................ | H04B 7/18513 |
| | | | 370/350 |
| 2023/0336229 A1* | 10/2023 | Gopalakrishnan ... | H04B 7/0626 |

* cited by examiner

Preference Index:

| Primary Node Ranking | Timing Advance (TA) | Angle of Arrival (AoA) |
|---|---|---|
| MeNB-3 | Bin-1: 1-400μs | Range-1: 0-45 degrees |
| MeNB-1 | Bin-2: 401-800μs | Range-2: 45.01-90 degrees |
| MeNB-2 | Bin-3: 801-1200μs | Range-3: 90.01-120 degrees |

SYSTEM AND METHOD OF SECONDARY NODE ASSISTED DUAL CONNECTIVITY IN WIRELESS NETWORKS

SUMMARY

A high-level overview of various aspects of the invention are provided here for that reason, to provide an overview of the disclosure and to introduce a selection of concepts that are further described below in the Detailed Description section. This summary is not intended to identify key features or essential features of the claimed subject matter, nor is it intended to be used as an aid in isolation to determine the scope of the claimed subject matter.

In one aspect, a computerized method is provided. In accordance with the method, and index is electronically generated that has a plurality of available primary nodes and a plurality of bins, each of the plurality of available primary nodes corresponding to one of the plurality of bins. A user device is determined to be concurrently connected to a secondary node and a primary node, wherein the primary node currently connects the user device to a wireless network. A timing advance value and an angle of arrival value of the user device currently connected to the primary node are determined. It is determined whether the timing advance value and the angle of arrival value correspond to a particular bin in the plurality of bins of the index. An optimal primary node in the plurality of available primary nodes, the optimal node corresponding to the particular bin to which the timing advance value and the angle of arrival value of the user device are determined to correspond. An assist notification is communicated to the primary node, the assist notification triggering the primary node to send a handover communication to the user device and cause the user device to connect to the optimal primary node.

In another aspect, one or more non-transitory computer-readable media are provided for storing instructions that when executed via one or more processors performs a computerized method. Via one or more processors, and without user intervention, an index having a plurality of available primary nodes and a plurality of bins is electronically generated, each of the plurality of available primary nodes corresponding to one of the plurality of bins.

A user device is determined to be concurrently connected to a secondary node and a primary node, wherein the primary node currently connects the user device to a wireless network. A timing advance value and an angle of arrival value of the user device currently connected to the primary node are determined. It is determined whether the timing advance value and the angle of arrival value correspond to a particular bin in the plurality of bins of the index. An optimal primary node in the plurality of available primary nodes, the optimal node corresponding to the particular bin to which the timing advance value and the angle of arrival value of the user device are determined to correspond. An assist notification is communicated to the primary node, the assist notification triggering the primary node to send a handover communication to the user device and cause the user device to connect to the optimal primary node.

In yet another aspect, a system is provided. The system includes a primary node in a telecommunication network and a secondary node in the telecommunication network. The secondary node determines whether the user device is concurrently connected to a secondary node and a primary node, wherein the primary node currently connects the user device to a wireless network. The secondary node determines a timing advance value and an angle of arrival value of the user device currently connected to the primary node. The secondary node determines whether the timing advance value and the angle of arrival value correspond to a particular bin in the plurality of bins of the index. The secondary node determines an optimal primary node in the plurality of available primary nodes, the optimal node corresponding to the particular bin to which the timing advance value and the angle of arrival value of the user device are determined to correspond. The secondary node communicates an assist notification to the primary node, the assist notification triggering the primary node to send a handover communication to the user device and cause the user device to connect to the optimal primary node.

BRIEF DESCRIPTION OF THE DRAWINGS

Aspects are described in detail below with reference to the attached drawings, wherein:

FIG. 2 illustrates an example of an index that is generated and/or referenced in accordance with one or more embodiments;

DETAILED DESCRIPTION

Figure 1:
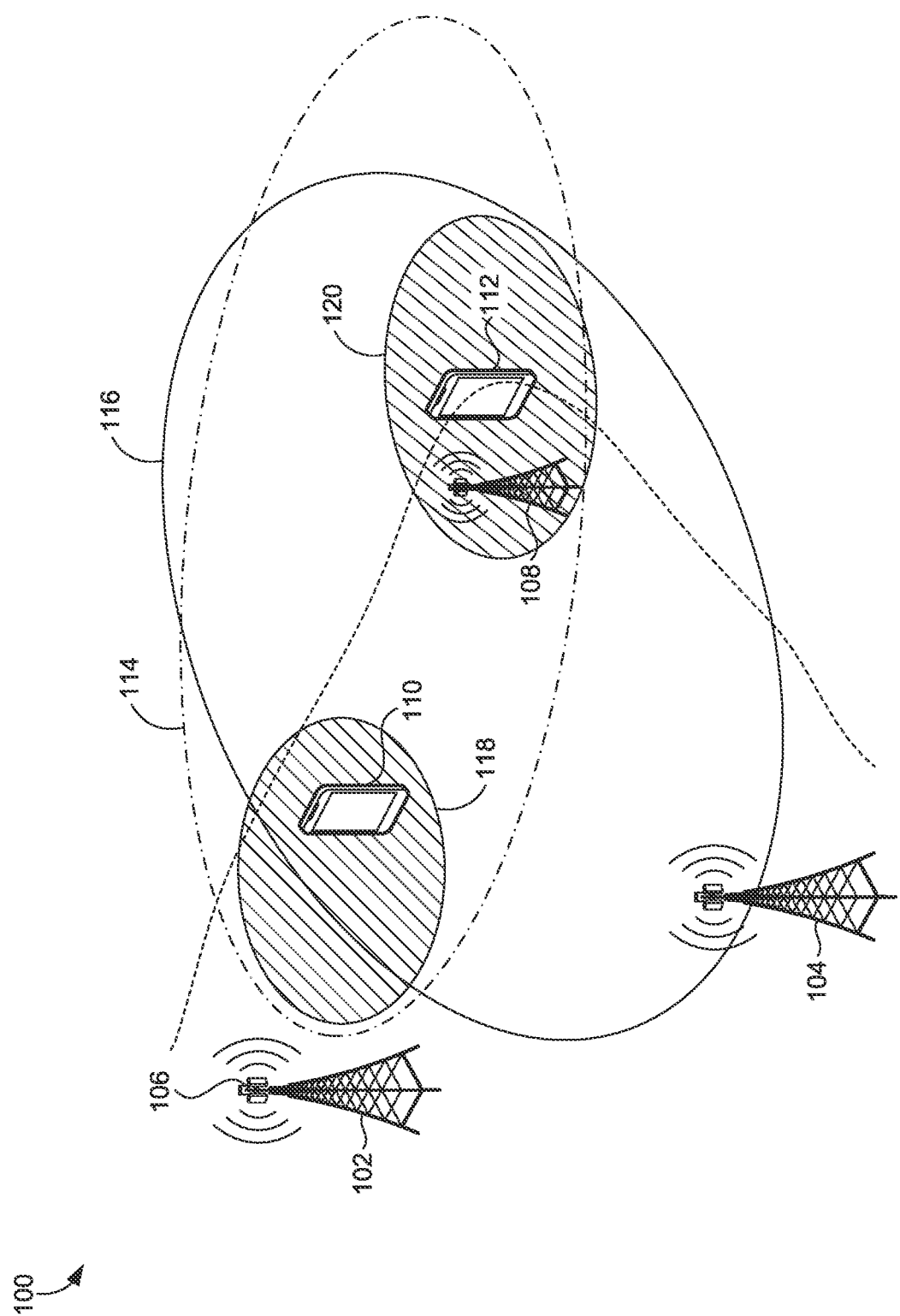
FIG. 1 depicts an example of a system environment for an application in accordance with one or more embodiments.

The subject matter of the present invention is being described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Definitions

Throughout this disclosure, several acronyms and shorthand notations are used to aid in the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
5GC Fifth-Generation Wireless Access Technology Core Network
CDMA Code Division Multiple Access
CD-ROM Compact Disk Read Only Memory
CU Central unit
DU Distribution unit
DVD Digital Versatile Disc
EEPROM Electrically Erasable Programmable Read-Only Memory
eMBB Enhanced Mobile Broadband
E-UTRAN Evolved Universal Mobile Telecommunications System
FD-MIMO Full Dimension Multiple-Input Multiple-Output
GIS Geographic/Geographical/Geospatial Information System
GPRS General Packet Radio Service
GSM Global System for Mobile Communications
iDEN Integrated Digital Enhanced Network
HIOT Industry Internet of Things
IOT Internet of Things
LED Light Emitting Diode
LTE Long Term Evolution
MD Mobile Device
MEC Mobile Far Edge Computer
MIMO Multiple-Input Multiple-Output
mMIMO Massive Multiple-Input Multiple-Output
mMTC Massive Machine Type Communication
mmWave Millimeter Wave
NEXRAD Next-Generation Radar
NR New Radio
PC Personal Computer
PCS Personal Communications Service
PDA Personal Digital Assistant
PLMN Public Land Mobile Network
RAM Random Access Memory
RAN Radio Access Network
RF Radio-Frequency
ROM Read-Only Memory
RRU Remote Radio Unit
RU Radio Unit
SON Self-Organizing Networks
TDMA Time Division Multiple Access
TXRU Transceiver
UE User Equipment
UMTS Universal Mobile Telecommunications System
URLLC Ultra-Reliable Low Latency Communications
UTRAN Universal Terrestrial Radio Access Network
WCD Wireless Communication Device (interchangeable with UE)
WLAN Wireless Local Area Network
XR Extended Reality Further, various technical terms are used throughout this Detailed Description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media includes both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage device, or any other medium which can be used to store the desired information and which may be accessed by the computing device 700 shown in FIG. 7.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunication network (e.g., 3G, 4G, 5G, CDMA, CDMA 1XA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLO-NASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point," "base station," and "node" are used interchangeably herein to refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femtocell or picocell. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network. As discussed herein, an eNodeB that is configured for LTE can provide E-UTRAN New Radio—Dual Connectivity ("ENDC") whereas a gNodeB that is configured for 5G can provide New Radio—Dual Connectivity ("NRDC").

The terms "primary node" and "master node" are used interchangeably herein when describing dual connectivity scenarios. A primary node/master node, in the dual connectivity context, refers to an access point ("node") that provides or can provide user equipment a wireless connection to a telecommunication network, wherein the user device initially connects to the node prior to forming a second connection (e.g., dual connection to another node) based on the node being pre-configured to operate as a primary node in the telecommunication network. Thus, the primary node is the node to which a user device first forms a connection prior to forming a secondary connection to another node. The term "secondary node," in the dual connectivity context, refers to an access point ("node") that provides or can provide user equipment a wireless connection to a telecommunication network, wherein the user device connects to this node subsequent to forming the first or initial connection with the primary node, based on the node being pre-configured to operate as a secondary node in the telecommunication network. As such, the secondary node forms the connections to the user device, while the user device is concurrently connected to the primary node. Generally, once the user device establishes a first connection to the primary node, the primary node assists the user device in establishing a second and subsequent connection with a secondary node. In some specific implementations, such as an ENDC configuration within an LTE network, an eNodeB is configured to operate as a primary node whereas a gNodeB is configured to operate as a secondary node. In another specific implements, such as an NRDC configuration within a 5G network, a gNodeB is configured to operate as a primary node having a relatively large coverage area whereas another gNodeB configured to operate as a secondary node having a relatively small coverage area relative to the primary node's configuration.

"User equipment," "UE," "mobile device," "user device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, mMIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Aspects of the invention herein provide systems, methods, and media that facilitate a secondary node in a telecommunication network to dynamically communicate feedback to a primary node that is presently providing service to a user device, based on the when the secondary node identifying one or more additional primary nodes that are predicted to provide improved throughput and lower latency for the user device relative to the primary node that is presently providing service to a user device. In this manner, the secondary node intelligently assists the primary node by determining whether a user device should be handed over to another nearby (e.g., in-range for wireless communications over the telecommunication network) primary node to improve the experience at the user device, or whether the user device should not be handed over to another nearby primary node as the present service-providing primary node is providing a better service experience. In such aspects, the user device is operating with dual connectivity such that the user device has a connection to each of the primary and secondary nodes. As such, the primary node presently providing service to a user device, the secondary node making said determinations, and at least one other primary node is within range of the user device such that there is overlap in the corresponding coverage area(s) of the primary node, secondary node, and the at least one other primary node.

The systems, methods, and media that facilitate a secondary node in a telecommunication network to dynamically communicate feedback to a primary node can be implemented in multiple scenarios and arrangements. In various aspects, the primary node may provide dual connectivity to the user device, such that the user device has both an LTE connection and an NR connection to the same physical cell site of the primary node. When both connections of the dual connectivity of the user device are established with the primary node at the same physical site, this is referred to a "co-located" dual connectivity scenario. In a co-located scenario, the secondary node may be nearby node that operates with relatively higher frequency and a corresponding relatively smaller coverage area than the primary node. An example of a secondary node would be a non-macro cell or small cell operating on millimeter waves ("mmWave") frequencies, for example, at or above 24 GHz. In the co-located scenario, the secondary node can communicate with the primary node that is presently providing service to the user service over both "legs" (e.g., LTE and NR) and can make the determination of whether another nearby primary node is predicted to provide improved service to the user device. However, a user device generally experiences improved throughput and lower latency when operating in a co-located scenario, though not always. Yet, a handoff of user device to another primary node may result in improved throughput and lower latency in co-located scenarios involving an NRDC configuration, for example.

In other aspects, the primary node and the secondary node may together provide dual connectivity to the user device, for example, such that the user device has an LTE connection to the primary node and an NR connection to the secondary node, where the primary node and the secondary node are located at distinct or different physical cell sites but are within communications range of one another. When the connections of the dual connectivity of the user device are established using nodes located at separate physical sites, this is referred to a "non-co-located" dual connectivity scenario. In a non-co-located scenario, the secondary node can communicate with the primary node that is presently providing service to the user service over the LTE leg as well as the user device that is connected to the secondary node over the NR leg. The secondary node can make the determination of whether another nearby primary node is predicted to provide improved service to the user device relative to the LTE leg service provided by the primary node to the user device. A user device generally experiences decreased throughput and increased latency when operating in a non-co-located scenario. For example, when a user device is located at the edge of the coverage area of a primary node presently providing an LTE connection to the user device, the throughput of 5G-NSA may be degraded to a levels (e.g., measured as megabytes per second) at or lower than the LTE connection.

Though co-located scenarios are less likely to result in a positive handoff determination than non-co-located scenarios, both co-located and non-co-located scenarios are contemplated to be within the scope of the invention as there are situations where a handoff of the user device to a different primary node is determined by the secondary node to improve the user experience relative to the primary node presently providing service to the user device. As such, the systems, methods, and media are discussed hereinafter as applicable to co-located and non-co-located scenarios, unless expressly stated otherwise.

Systems, Methods, and Media

FIG. 1 depicts an example of a system environment 100 for an application in accordance with one or more embodiments. The system environment 100 incudes one or more primary nodes 102 and 104 and one or more secondary nodes 106 and 108. In FIG. 1 the secondary node 106 is at the same physical location or cell site as primary node 102. For simplicity of the illustration, the secondary node 106 is shown as an antenna of the cell site that is configured distinctly from one or more antenna of the primary node 102. A plurality of user devices 110 and 112 are also present within the system environment 100. The one or more primary nodes 102 and 104 and the one or more secondary nodes 106 and 108 provide the plurality of user devices 110 and 112 access to a telecommunication network through corresponding wireless coverage areas. For example, primary node 102 has a corresponding coverage area 114 and primary node 104 has a corresponding coverage area 116. In this example, the primary nodes 102 and 104 are depicted as macro cells, such as an eNodeB or a gNodeB. When a user device in within a corresponding wireless coverage area, the user device can connect to the telecommunication network through the antenna of the corresponding node. In this example, the secondary nodes 106 and 108 are depicted as non-macro cells having relatively smaller coverage areas. For example, secondary node 106 has a corresponding coverage area 118 and secondary node 108 has a corresponding coverage area 120. There are areas of overlap between the coverage areas 114 and 116 of the primary nodes 102 and 104 and each of the coverage areas 118 and 120 of the secondary nodes 106 and 108.

In some instances, the primary node operates in a co-located scenario with the secondary node, for example, wherein primary node 102 provides both connections for dual connectivity to the user device at one physical cell site. For example, the primary node 102 may provide both concurrent LTE and NR connections to the user device 110 at one physical cell site with which the primary node 102 is associated. The secondary node 106 can be associated with the same physical cell site as the primary node 102, in this example, wherein the secondary node 106 provides the coverage area 118 using high-frequencies but having a smaller geographic range relative to the primary node 102. As shown, the user device 110 is located within an area of overlap of the coverage area 114 of the primary node 102 and the coverage area 118 of the secondary node.

In another instance, the primary node and secondary node operate to provide connections for dual connectivity to the user device using different physical cell sites, such that the primary and secondary nodes are operating in a non-co-located scenario. For example, the primary node 104 may provide an LTE connection to the user device 112 via coverage area 116 while the secondary node 108 concurrently provides an NR connection to the same user device 112 via coverage area 120. As shown, the user device 112 is located within an area of overlap of the coverage area 116 or the primary node 104 and the coverage area 120 of the secondary node.

In various aspects, a secondary node determines whether a user device is concurrently connected to the primary node and/or the secondary node. The primary and secondary nodes currently connect a user device to a wireless network using separate legs, such as LTE and NR configurations, in a non-co-located scenario. For example, the secondary node 108 can determine whether the user device 112 is connected to the secondary node 108 as well as the primary node 104 in FIG. 1, using dual connectivity. In a co-located scenario, the secondary node may determine that the user device is concurrently connected to the primary node which provides dual connectivity over both an LTE and NR leg. In such an example, the secondary node determines this by communicating with the primary node, as communication directly with the user device is not required. For example, the secondary node 106 can determine whether the user device 110 is connected to the primary node 102 in FIG. 1 using dual connectivity, where both connections are established with the primary node 102. When the user device has established dual connectivity with the primary node and/or the secondary node, further actions are undertaken to facilitate the secondary node to dynamically evaluate and communicate feedback to a primary node.

In aspects, any of the primary nodes 102 and 104, the secondary nodes 106 and 108, a server, and/or other backhaul components (not shown for simplicity) in the telecommunication network electronically generate an index that is leveraged when dynamically evaluating and communicating feedback to a primary node. The index includes a plurality of available primary nodes and a plurality of bins, each of the plurality of available primary nodes corresponding to one of the plurality of bins. FIG. 2 illustrates an example of an index 200 that is referenced and/or generated in accordance with one or more embodiments, as further discussed hereinafter. As shown in the example of FIG. 2, the index 200 can be stored in memory as structured data with rows that identify a particular primary node. Within the row for a particular primary node, at least one column may include the identifier (e.g., "MeNB-3") that is unique to the particular primary node. In another column within the same row, one or more values (or a range) may be specified that define the timing advance characteristic associated with the particular primary node (e.g., shown generally as "Bin-1"). Yet other column within the row for the particular node may include one or more values (or a range) may be specified that define the angle of arrival characteristic that is associated with the particular primary node (e.g., shown generally as "Range-1"), as shown in the example of FIG. 2. It will be understood that the index 200 is shown as simplified for this discussion, and other attributes of the primary nodes can be stored in the index such as geolocation of the primary node, historical data of the primary node, performance and service data of the primary node, previous handoff information of the primary node, and/or the like. The values and characteristics for each primary node in the index can be predetermined or dynamically determined. As such, the value ranges for the timing advance and the angle of arrival can be customized. For example, the angle of arrival ranges could be customized to encompass intervals of only 10 degrees (e.g., Range 1: 0-10.00 degrees, Range 2: 10.01-20 degrees, and so on), as opposed to the 45 degree increments shown in the example of FIG. 2. In one example, the timing advance bins could be customized into other timing intervals (e.g., Bin-1: 1-300 μs, Bin-2: 301-600 μs, Bin-3: 601-900 μs, Bin-4: 901-1200 μs, and so on), unlike the 400 microsecond intervals shown in FIG. 2. Accordingly, there is not a limit on the quantity of Bins or Ranges defined in the index, and the ranges or intervals can be customized for a cell site.

In various aspects, the index can be built or generated, without manual interaction or user input, by leveraging historical and location information for the primary nodes and one or more neighboring primary nodes. For example, any of the primary nodes 102 and 104, the secondary nodes 106 and 108, a server, and/or other backhaul components may be configured to autonomously generate the index, and the index may be communicated to, accessible by, "pushed" to, and/or shared between the primary nodes 102 and 104, the secondary nodes 106 and 108, a server, and/or other backhaul components.

The secondary node can calculate, identity, and/or determine a total distance between a secondary node and each of a plurality of available primary nodes in the index. This secondary node will operate to assist in evaluating and determining an optimized primary node for a particular user device. For simplicity of this discussion, the generation of the index and computer tasks is discussed with reference to the secondary node 108 as evaluating and determining an optimized primary node for the user device 112 shown in FIG. 1. The secondary node 108 can identify overlapping of service coverage areas of the secondary node 108 and each of the plurality of available primary nodes 104 and 102. For example, the secondary node 108 can identify that the coverage area 114 of the primary node 102 overlaps with the coverage area of the primary node 104, such that the user device 112 is within both coverage areas of the corresponding primary nodes. Thus, the primary nodes 102 and 104 are "available" to the user device 112 for a connection as being in-range. In this example, the user device 112 is connected to the primary node 102 using LTE and is connected to the secondary node 108 using NR such that the user device 112 is operating with dual connectivity, for the purpose of the discussion. The secondary node 108 can wirelessly communicate with the user device 112 using its corresponding coverage area 120, and can wirelessly communicate with both the primary nodes 102 and 104 through their corresponding coverage areas 114 and 116, respectively. The secondary node 108 is thus connected to the same telecommunication network as the primary nodes 102 and 104.

In order for the secondary node 108 to evaluate and determine an optimal primary node for the user device 112 that is presently connected to primary node 102, the secondary node 108 leverages information for the primary nodes stored in an index. As such, the secondary node 108 can generate, access, and/or reference an index and the values for corresponding characteristics in order to perform an assist in determining the optimal primary node to service the user device 112. The index may be previously generated, previously predefined, or dynamically generated, in various aspects.

The secondary node 108 (or other component in the telecommunication network) may dynamically generate an index, in some aspects, through execution of one or more computer tasks. For example, the secondary node 108 can determine a historical load utilization for each of the plurality of available primary nodes, including primary node 102 to which the user device 112 is connected, for comparison to other available primary nodes such as the primary node 104. Additionally or alternatively, the secondary node 108 can determine a total quantity of frequency layers available at each of the plurality of available primary nodes. Additionally or alternatively, the secondary node 108 can determine a total bandwidth capacity for each of the plurality of available primary nodes. In some aspects, the secondary node 108 can determine a historical load utilization for each of the plurality of available primary nodes, determine a total quantity of frequency layers available at each of the plurality of available primary nodes, and determine a total bandwidth capacity for each of the plurality of available primary nodes. This information can be determined by the secondary node 108 using historical data stored, whether locally or remotely, and accessible to the secondary node 108. Using the historical load utilization, the total quantity of frequency layers available, the total bandwidth capacity, or any combination thereof for the available primary nodes, the secondary node 108 populates a plurality of bins when generating the index, wherein each bin (e.g., the columns within a particular row) defines a distinct combination of a particular timing advance value and a range of angle of arrival values that are associated with each available primary node. As such, value(s) or range(s) defining characteristics for each available primary node is stored in the plurality of bins, for example, as columns and rows in the example index 200 of FIG. 2.

Accordingly, in various aspects, the secondary node 108 can automatically determine the plurality of bins, via a processor and without manual intervention or user input, wherein each bin defines a distinct combination of a particular timing advance value and a range of angle of arrival values. For each bin in the plurality of bins, the secondary node can calculate one or more PDCP layer metrics, which represent throughput and latency, for the corresponding distinct combination of a particular timing advance value and a range of angle of arrival values.

The secondary node can rank each of the available primary nodes, including primary node 102 which is presently connected to the user device 112, in order of user device performance metrics. Alternatively, the secondary node 108 can reference the index having the plurality of available primary nodes and the corresponding plurality of bins for those nodes when the index was previously generated or previously defined.

The secondary node 108 calculates, identifies, and/or determine a timing advance value of the user device 112 and an angle of arrival value of the user device 112 as currently connected to the primary node 102. The secondary node 108 can use the timing advance and the angle of arrival to estimate the geographic location of the user device 112. As used herein, "timing advance" refers to the duration or length of time that it takes a signal to reach a node (i.e., a primary node) as sent from the user device. The timing advance value represents the distance between the user device and the node at issue and is measured as the time difference between a received uplink packet relative to the timestamp on the packet. The term "angle of arrival" refers to a position of the user device that is calculated using angular directions (i.e., azimuth and elevation) that are measured between the user device and the node (i.e., a primary node), wherein the angle refers to the angle at which the signal sent by the user device meets or "arrives" at a receiver at the node. The angle of arrival represents a direction in which the user device is transmitting.

Then, the secondary node 108 can determines whether the timing advance value and an angle of arrival value correspond to a particular bin in the plurality of bins of the index, wherein each available primary nodes has corresponding value(s) or range(s). As such, the secondary node 108 can determine which one of the plurality of available primary nodes is a best fit or match to the timing advance value and an angle of arrival value of the user device 112 based on the timing advance value and an angle of arrival value bins/range for that primary node, as found in the index. In this manner, the secondary node 108 can evaluate whether the timing advance value of the user device 112 aligns with, matches, or is within a defined range of the timing advance value(s)/range(s) of one of the plurality of available primary nodes, and whether the angle of arrival value of the user device 112 aligns with, matches, or is within a defined range of the angle of arrival value(s)/range(s) of one of the plurality of available primary nodes. In specific aspects, the secondary node determines whether both the timing advance value and angle of arrival value of the user device 112 align with, match, or are within the defined value(s)/ranges for the timing advance and angle of arrival value(s)/range(s) defined for one particular primary node in the plurality of available primary nodes, as found in the index.

Based on the comparison between the values for the user device 112 and the index, the secondary node 108 identifies an optimal primary node in the plurality of available primary nodes, where that optimal node corresponds to the particular bin to which the timing advance value and the angle of arrival value of the user device have been determined to correspond. As such, the secondary node 108 can determine whether the primary node 102 that is presently servicing the user device 112 is not optimal, for example, relative to another available primary node, such as primary node 104 that is not presently servicing the user device 112 but which is in-range and would be optimal based on an alignment of the user device's values to those values corresponding to the primary node 104 in the index.

When the presently-connected primary node is determined to be non-optimal based on the index, and/or when another primary is determined to be optimal or improved over the presently-connected primary node, the secondary node 108 communicates an assist notification to the primary node 102 that is presently connected to the user device 112. The assist notification triggers the primary node 102 to send a handover communication to the user device 112 and causes the user device 112 to connect to the optimal primary node, such as primary node 104. The assist notification may be an X2AP message in some aspects, and this message can trigger the primary node to generate and communicate a handover command to the user device 112 which causes the user device 112 to disconnect from the primary node 102 and connect instead to another primary node identified by the handover command, such as primary node 104. Such a handover command may utilize an X2 procedure in some aspects.

In aspects, the secondary nodes are able to perform a service quality evaluation of dual connectivity in user devices on a per device basis, and can provide feedback to primary nodes that facilitate handovers to other primary nodes in a manner that improves the service quality for the user device operating with dual connectivity.

Having described the system environment 100 and components thereof, it will be understood by those of ordinary skill in the art that system environment 100 is but one example of a suitable system and is not intended to limit the scope of use or functionality of the present invention. Similarly, the system environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in various implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 3:
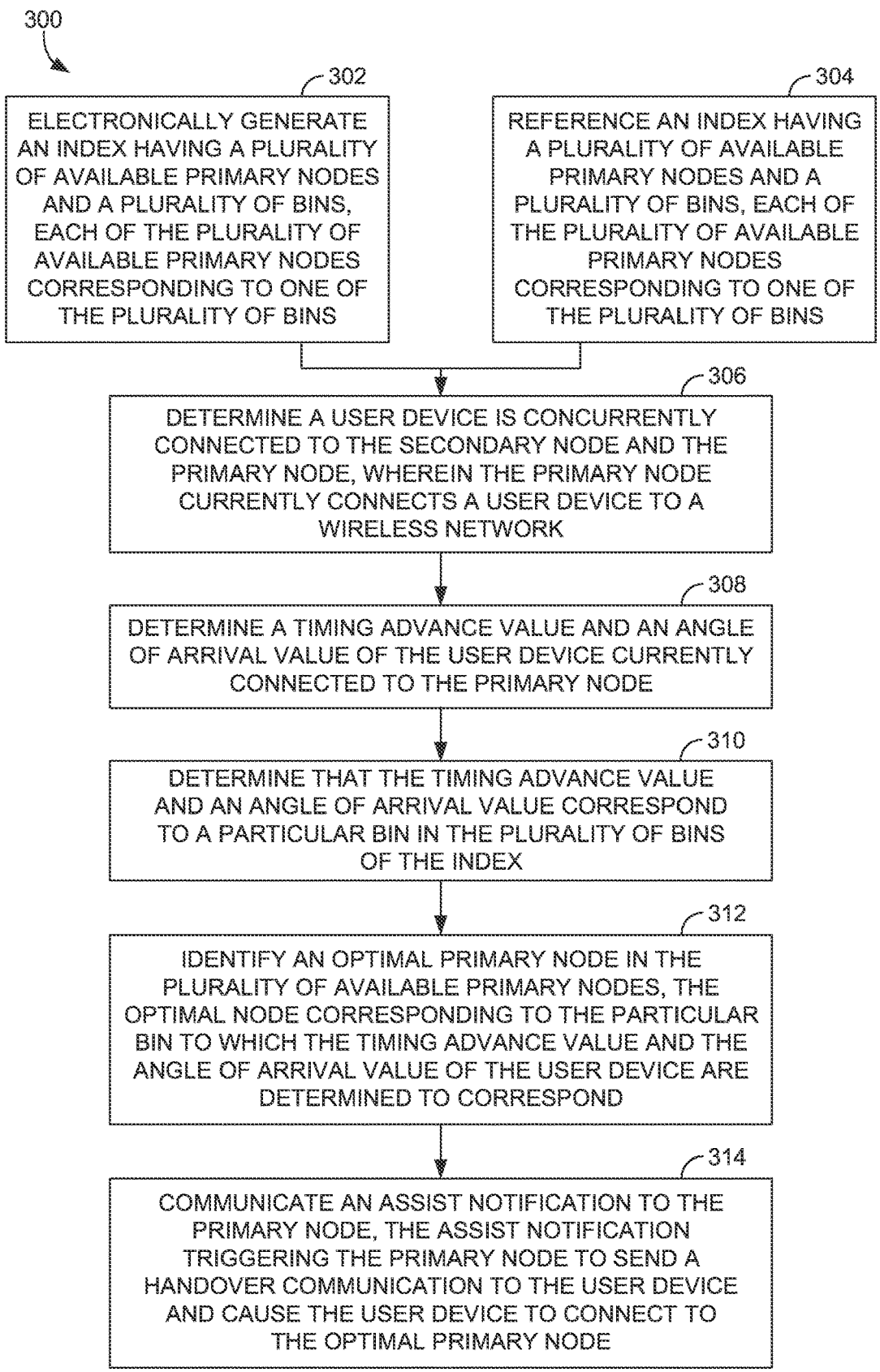
FIG. 3 a flowchart of an example method in accordance with one or more embodiments.

Turning now to FIG. 3, a method 300 is discussed that can be performed via one or more of the components and component interactions previously described in FIG. 1. As such, the method is discussed briefly for brevity, though it will be understood that the previous discussion and details described therein can be applicable to aspects of the method 300 of FIG. 3. Additionally or alternatively, it will be understood that the method 300 discussed herein can be implemented or performed via the execution of computer-readable instructions stored on computer readable media, by one or more processors. The method 300 discussed hereinafter may be computer-implemented methods. In embodiments, one or more non-transitory computer-readable storage medium having computer-executable/computer-readable instructions that are utilized to perform the method 300.

At block 302, an index is electronically generated that has a plurality of available primary nodes and a plurality of bins, each of the plurality of available primary nodes corresponding to one of the plurality of bins. Alternatively, at block 304, an index having a plurality of available primary nodes and a plurality of bins is referenced, each of the plurality of available primary nodes corresponding to one of the plurality of bins. In such an aspect, the index may have been previously generated or predefined. In electronically generating the index, a total distance between the secondary node and each of the plurality of available primary nodes is calculated. Overlapping service coverage areas of the secondary node and each of the plurality of available primary nodes are identified as well, such that the secondary node can determine those primary nodes that at least partially overlap in coverage with the secondary node, and thus, with each other to some degree. In some aspects, the index is generated by determining a historical load utilization for each of the plurality of available primary nodes, determining a total quantity of frequency layers available at each of the plurality of available primary nodes, and/or determining a total bandwidth capacity for each of the plurality of available primary nodes. Additionally or alternatively, the index can be generated based on inter-site distances measured between the secondary node and each of the available primary nodes, and/or the percentage of coverage area overlap between the secondary node and each of the available primary nodes. Based on the data determinations indicated above, the index can be generated by populating a plurality of bins, wherein each bin defines a distinct combination of a particular timing advance value and a range of angle of arrival values. For example, the secondary node can monitor and record data over time such timing advance, the angle of arrival, and the throughput for each of several user devices as associated with various nearby primary nodes. The secondary node can compile this historical data for various sessions to generate the index, wherein the values and ranges are based on this historical data.

In various aspects, the index is generated by automatically determining, via a processor, a plurality of bins, wherein each bin defines a distinct combination of a particular timing advance value and a range of angle of arrival values, and each primary node is associated with a particular bin. For each bin in the plurality of bins, one or more PDCP layer metrics are calculated for the corresponding distinct combination of a particular timing advance value and a range of angle of arrival values. Then, each of the available primary nodes are ranked within the index in order of user device performance metrics. Alternatively, in some aspects, the index has been predefined or previously generated. In such aspects, the index may simply be referenced, as stored in memory that is accessible by the secondary node.

Figure 4:
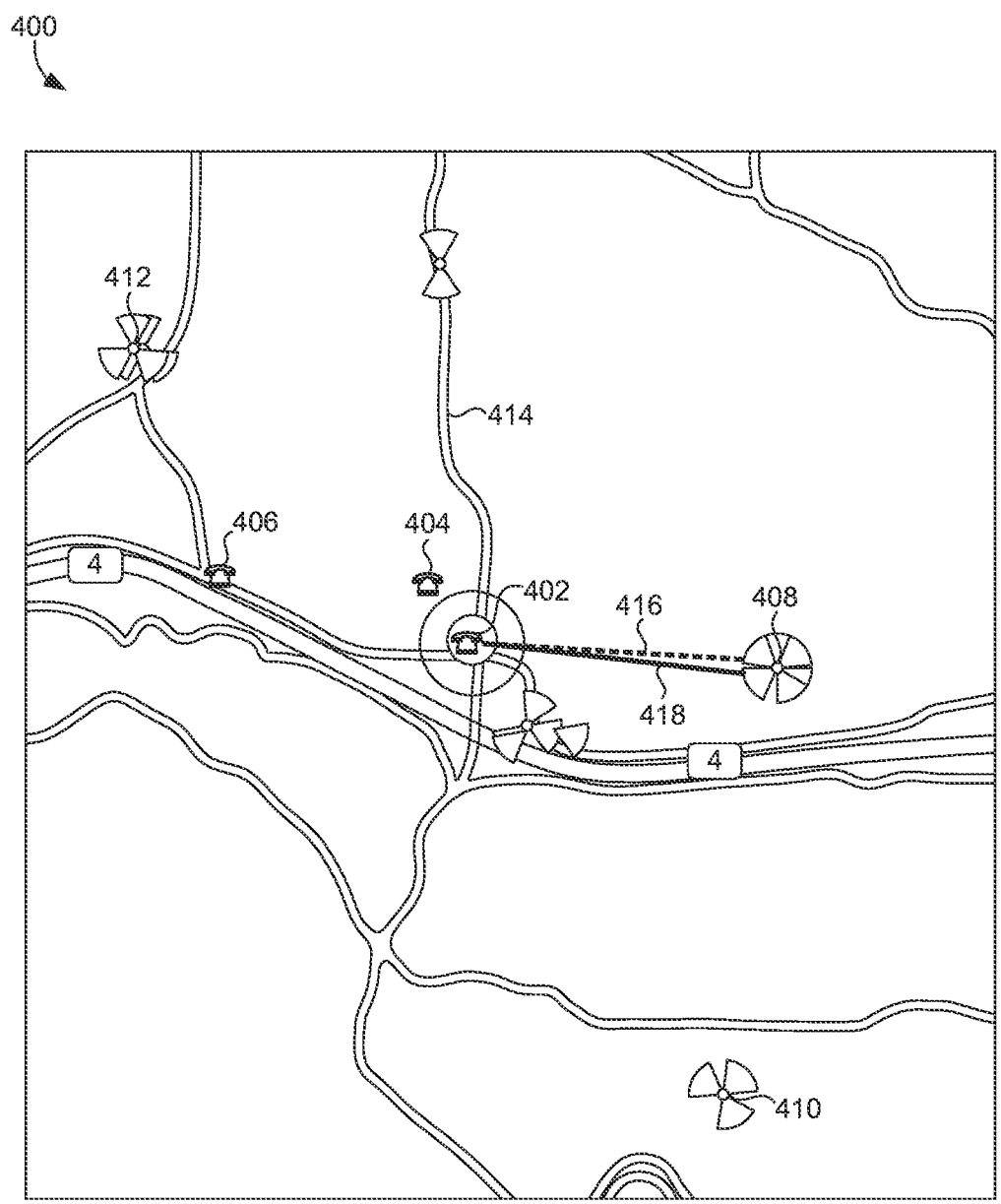
FIG. 4 depicts an example illustrating a user device with dual connectivity via one node within a geographic area, in accordance with one or more embodiments.
Figure 5:
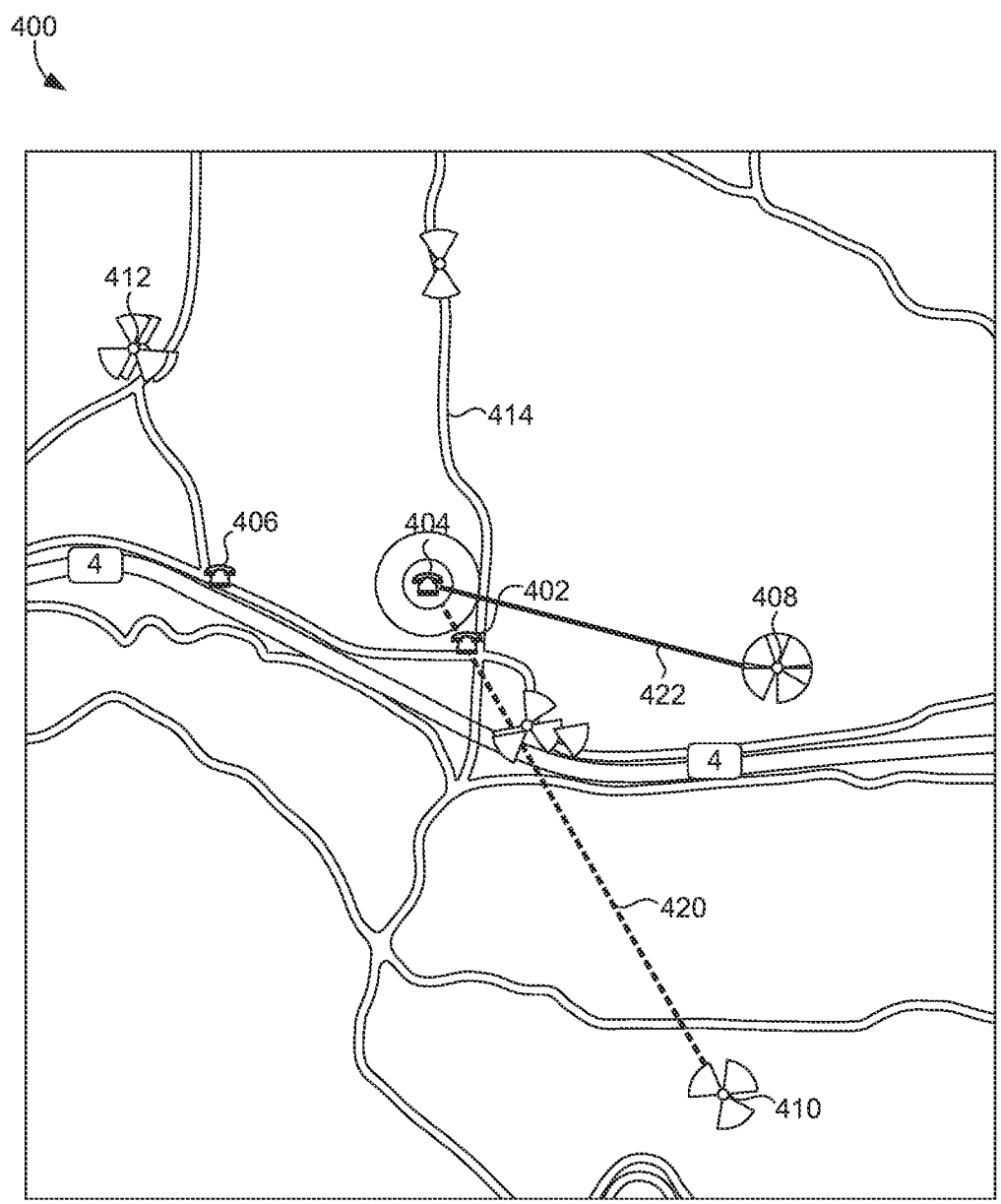
FIG. 5 depicts an example illustrating another user device with dual connectivity via a primary node and a secondary node within a geographic area, in accordance with one or more embodiments.
Figure 6:
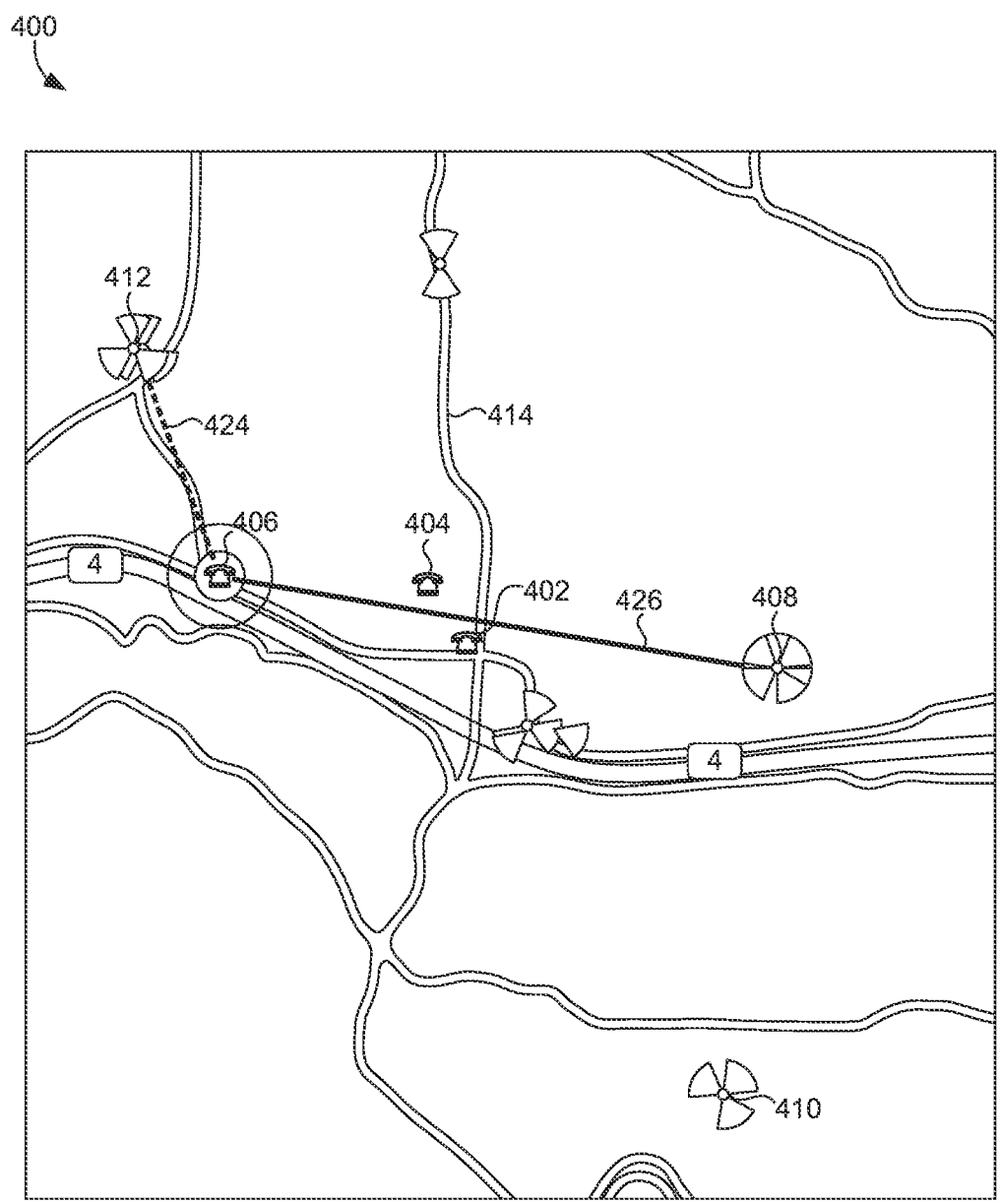
FIG. 6 depicts an example illustrating yet another user device with dual connectivity via a primary node and a secondary node within a geographic area, in accordance with one or more embodiments.

At block 306, it is determined whether a user device is concurrently connected to a secondary node and a primary node, wherein the primary node currently connects a user device to a wireless network. For example, FIG. 4 depicts a user device 402 with dual connectivity via co-located primary and secondary nodes (shown as 408) within a geographic area 400 that areas near a particular highway and road 414. As such, the user device 402 in this co-located scenario is concurrently connected to a secondary node and a primary node at the same cell site. The user device 402 can be determined to have an LTE connection 416 (dashed line) and an NR connection 418 associated with the cell site. In another example, FIG. 5 depicts another user device 404 with dual connectivity via a primary node 410 and a secondary node 408 within the geographic area 400. The user device in this non-co-located scenario would be determined to be concurrently connected to a primary node 410 using an LTE connection 420 (dashed line) and the secondary node 408 using an NR connection 422. In yet another example, FIG. 6 depicts yet another user device 406 with dual connectivity via a primary node 412 and a secondary node 408 within the geographic area 400. The user device 406 in this non-co-located scenario would be determined to be concurrently connected to the primary node 412 using an LTE connection 424 (dashed line) and the secondary node 408 using an NR connection 426. FIGS. 4-6 illustrate various examples of co-located and non-co-located scenarios to which the present method 300 can be utilized and implemented on a per user device basis.

Continuing with the method 300, at block 308, a timing advance value and an angle of arrival value of the user device currently connected to the primary node are determined. At block 310, it is determined that the timing advance value and an angle of arrival value correspond to a particular bin in the plurality of bins of the index. Then, at block 312, an optimal primary node in the plurality of available primary nodes is identified, the optimal node corresponding to the particular bin to which the timing advance value and the angle of arrival value of the user device are determined to correspond. At block 314, an assist notification is communicated to the primary node, the assist notification triggering the primary node to send a handover communication to the user device and cause the user device to connect to the optimal primary node. The assist notification can be generated by and communicated from a secondary node to the primary node that is presently provided a connection for the user device.

Figure 7:
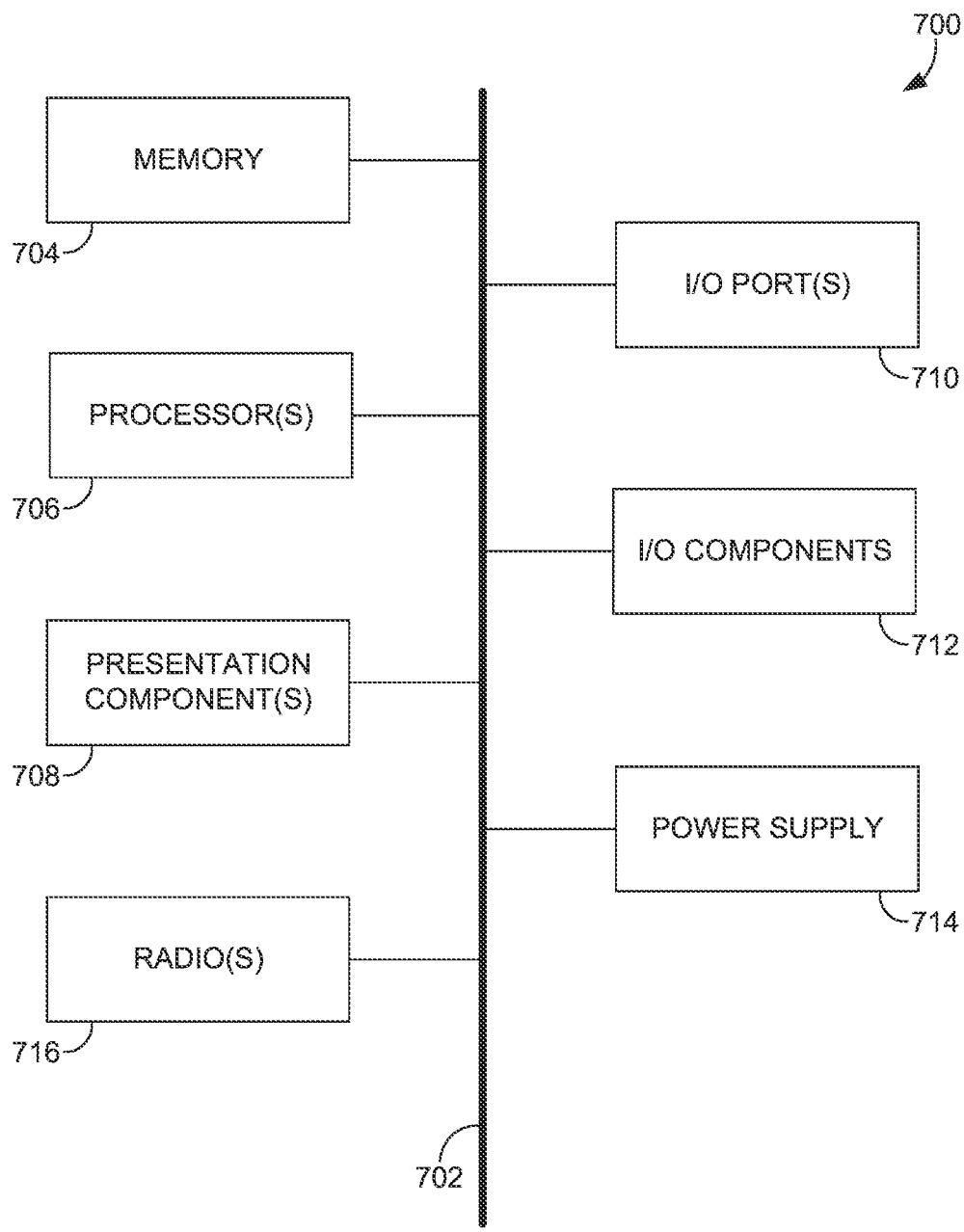
FIG. 7 illustrates an example computing device suitable for use in implementations of the present disclosure.

Turning now to FIG. 7, a diagram is depicted of an example computing device 700 suitable for use in implementations of the present disclosure. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, and power supply 714. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of the I/O components 712. Also, processors, such as one or more processors 706, have memory. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Examples of memory include solid-state memory, hard drives, optical-disc drives, etc. Computing device 700 includes one or more processors 706 that read data from various entities such as bus 702, memory 704 or I/O components 712. One or more presentation components 708 present data indications to a person or other device. Examples of one or more presentation components 708 include a display device, speaker, printing component, vibrating component, etc. I/O ports 710 allow computing device 700 to be logically coupled to other devices, including I/O components 712, some of which may be built in computing device 700. Examples of I/O components 712 include a microphone, joystick, game pad, satellite dish, scanner, printer, wireless device, etc.

Radio 716 represents a radio that facilitates communication with a wireless telecommunication network. Illustrative wireless telecommunication technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method comprising:
electronically generating an index having a plurality of available primary nodes and a plurality of bins, each of the plurality of available primary nodes corresponding to one of the plurality of bins;
determining a user device is concurrently connected to a secondary node and a primary node, wherein the primary node currently connects the user device to a wireless network;
determining a timing advance value and an angle of arrival value of the user device currently connected to the primary node;
determining that the timing advance value and the angle of arrival value correspond to a particular bin in the plurality of bins of the index;
identifying an optimal primary node in the plurality of available primary nodes, the optimal node corresponding to the particular bin to which the timing advance value and the angle of arrival value of the user device are determined to correspond; and
communicating an assist notification to the primary node, the assist notification triggering the primary node to send a handover communication to the user device and cause the user device to connect to the optimal primary node.

2. The method of claim 1, wherein electronically generating the index comprises one or more of:
calculating a total distance between the secondary node and each of the plurality of available primary nodes; and
identifying overlapping of service coverage areas of the secondary node and each of the plurality of available primary nodes.

3. The method of claim 1, wherein electronically generating the index comprises one or more of:
determining a historical load utilization for each of the plurality of available primary nodes;
determining a total quantity of frequency layers available at each of the plurality of available primary nodes; and
determining a total bandwidth capacity for each of the plurality of available primary nodes.

4. The method of claim 1, wherein electronically generating the index comprises populating the plurality of bins, wherein each bin defines a distinct combination of a particular timing advance value and a range of angle of arrival values.

5. The method of claim 1, wherein electronically generating the index comprises automatically determining, via a processor, the plurality of bins, wherein each bin defines a distinct combination of a particular timing advance value and a range of angle of arrival values.

6. The method of claim 1, wherein electronically generating the index comprises, for each bin in the plurality of bins, calculating one or more PDCP layer metrics for the corresponding distinct combination of a particular timing advance value and a range of angle of arrival values.

7. The method of claim 1, wherein electronically generating the index comprises ranking each of the plurality of available primary nodes in order of user device performance metrics.

8. One or more non-transitory computer-readable media storing instructions that when executed via one or more processors performs a computerized method, the media comprising:
via one or more processors, without user intervention:
electronically generating an index having a plurality of available primary nodes and a plurality of bins, each of the plurality of available primary nodes corresponding to one of the plurality of bins;
determining a user device is concurrently connected to a secondary node and a primary node, wherein the primary node currently connects the user device to a wireless network;
determining a timing advance value and an angle of arrival value of the user device currently connected to the primary node;
determining that the timing advance value and the angle of arrival value correspond to a particular bin in the plurality of bins of the index;
identifying an optimal primary node in the plurality of available primary nodes, the optimal node corresponding to the particular bin to which the timing advance value and the angle of arrival value of the user device are determined to correspond; and
communicating an assist notification to the primary node, the assist notification triggering the primary node to send a handover communication to the user device and cause the user device to connect to the optimal primary node.

9. The media of claim 8, wherein electronically generating the index comprises one or more of:
calculating a total distance between the secondary node and each of the plurality of available primary nodes; and
identifying overlapping of service coverage areas of the secondary node and each of the plurality of available primary nodes.

10. The media of claim 8, wherein electronically generating the index comprises one or more of:
determining a historical load utilization for each of the plurality of available primary nodes;
determining a total quantity of frequency layers available at each of the plurality of available primary nodes; and
determining a total bandwidth capacity for each of the plurality of available primary nodes.

11. The media of claim 8, wherein electronically generating the index comprises populating the plurality of bins, wherein each bin defines a distinct combination of a particular timing advance value and a range of angle of arrival values.

12. The media of claim 8, wherein electronically generating the index comprises automatically determining, via a processor, the plurality of bins, wherein each bin defines a distinct combination of a particular timing advance value and a range of angle of arrival values.

13. The media of claim 8, wherein electronically generating the index comprises, for each bin in the plurality of bins, calculating one or more PDCP layer metrics for the corresponding distinct combination of a particular timing advance value and a range of angle of arrival values.

14. The media of claim 8, wherein electronically generating the index comprises ranking each of the plurality of available primary nodes in order of user device performance metrics.

15. A system comprising:
a primary node in a telecommunication network; and
a secondary node in the telecommunication network that:
references an index having a plurality of available primary nodes and a plurality of bins, each of the plurality of available primary nodes corresponding to one of the plurality of bins;
determines a user device is concurrently connected to the secondary node and the primary node, wherein the primary node currently connects the user device to the telecommunication network;
determines a timing advance value and an angle of arrival value of the user device currently connected to the primary node;
determines that the timing advance value and the angle of arrival value correspond to a particular bin in the plurality of bins of the index;
identifies an optimal primary node in the plurality of available primary nodes, the optimal node corresponding to the particular bin to which the timing advance value and the angle of arrival value of the user device are determined to correspond; and
communicates an assist notification to the primary node, the assist notification triggering the primary node to send a handover communication to the user device and cause the user device to connect to the optimal primary node.

16. The system of claim 15, wherein electronically generating the index comprises one or more of:
calculating a total distance between the secondary node and each of the plurality of available primary nodes; and
identifying overlapping of service coverage areas of the secondary node and each of the plurality of available primary nodes.

17. The system of claim 15, wherein electronically generating the index comprises one or more of:
determining a historical load utilization for each of the plurality of available primary nodes;
determining a total quantity of frequency layers available at each of the plurality of available primary nodes; and
determining a total bandwidth capacity for each of the plurality of available primary nodes.

18. The system of claim 15, wherein electronically generating the index comprises populating the plurality of bins, wherein each bin defines a distinct combination of a particular timing advance value and a range of angle of arrival values.

19. The system of claim 15, wherein electronically generating the index comprises automatically determining, via a processor, the plurality of bins, wherein each bin defines a distinct combination of a particular timing advance value and a range of angle of arrival values.

20. The system of claim 15, wherein electronically generating the index comprises, for each bin in the plurality of bins, calculating one or more PDCP layer metrics for the corresponding distinct combination of a particular timing advance value and a range of angle of arrival values.

* * * * *